United States Patent
Garnett et al.

(10) Patent No.: US 6,767,933 B2
(45) Date of Patent: Jul. 27, 2004

(54) RADIATION POLYMERIZABLE COMPOSITIONS

(75) Inventors: John Lyndon Garnett, Neutral Bay (AU); Allan Darley Matthews, Coogee (AU)

(73) Assignee: Ballina PTY LTD, New South Wales (AU)

( * ) Notice: Subject to any disclaimer, the term of this patent is extended or adjusted under 35 U.S.C. 154(b) by 0 days.

(21) Appl. No.: 10/107,942

(22) Filed: Mar. 27, 2002

(65) Prior Publication Data

US 2003/0073755 A1 Apr. 17, 2003

Related U.S. Application Data

(63) Continuation of application No. PCT/AU00/01195, filed on Sep. 29, 2000.

(30) Foreign Application Priority Data

Oct. 1, 1999 (AU) ............................................. PQ3211
Apr. 10, 2000 (AU) ............................................. PQ6795

(51) Int. Cl.$^7$ ............................ C08F 2/46; C09D 11/00
(52) U.S. Cl. ............................ 522/26; 522/81; 522/88; 522/104; 522/120; 522/121; 522/141; 522/142; 523/106; 427/500; 427/514
(58) Field of Search .................. 522/107, 96, 168, 522/179, 181, 104, 103, 120, 141, 114, 116, 125, 135, 136, 144; 526/318.2, 318.3, 323, 332, 333; 525/242, 279, 284, 285, 289, 293, 296, 298, 304, 308, 312

(56) References Cited

U.S. PATENT DOCUMENTS

| | | | | |
|---|---|---|---|---|
| 3,708,555 A | * | 1/1973 | Gaylord | 525/285 |
| 3,765,934 A | * | 10/1973 | Gaylord | 427/297 |
| 4,056,391 A | * | 11/1977 | Turner et al. | 430/72 |
| 4,072,519 A | * | 2/1978 | Pearson et al. | 430/72 |
| 4,112,146 A | | 9/1978 | Lazear | |
| 5,446,073 A | | 8/1995 | Jonsson et al. | |
| 5,494,962 A | * | 2/1996 | Gauthy et al. | 525/193 |
| 6,030,703 A | * | 2/2000 | Fan et al. | 428/378 |
| 6,090,509 A | * | 7/2000 | Shon et al. | 430/28 |
| 6,300,456 B1 | * | 10/2001 | Musa | 528/44 |
| 6,307,001 B1 | * | 10/2001 | Musa | 528/44 |

FOREIGN PATENT DOCUMENTS

| | | |
|---|---|---|
| EP | 0322808 A2 | 8/1989 |
| WO | WO90/10660 | 9/1990 |
| WO | WO92/02572 | 2/1992 |
| WO | WO97/31981 | 9/1997 |
| WO | WO01/24288 | 4/2001 |

OTHER PUBLICATIONS

Derwent Abstract Accession No. 97–048355/05, JP 08–301941 A (DENKI KAGAKU KOGYO KK) Nov. 19, 1996 (Abstract).

* cited by examiner

Primary Examiner—Susan Berman
(74) Attorney, Agent, or Firm—Norris, McLaughlin & Marc

(57) ABSTRACT

A radiation polymerizable composition comprising: (A) a donor/acceptor component for forming a charge transfer complex said component being selected from the group consisting of: (iii) a bifunctional compound having an electron donor group and an electron withdrawing group and a polymerizable unsaturated group; (iv) a mixture of (a) at least one unsaturated compound having an electron donor group and a polymerizable unsaturated moiety; and (b) at least one unsaturated compound having an electron acceptor group and a polymerizable unsaturated group; and (B) a binder polymer composition.

34 Claims, No Drawings

RADIATION POLYMERIZABLE COMPOSITIONS

This application is a continuation of application Ser. No. PCT/AU00/01195 filed Sep. 29, 2000

The present invention relates to radiation polymerisable compositions and in particular to compositions curable with ultraviolet light (UV) or electron beam (EB) radiation or elemental sources such as cobalt with its gamma rays, strontium 90 or caesium 137 and the like.

Radiation polymerisable compositions are used in a range of applications including coatings, inks and films. Radiation polymerisable compositions typically contain acrylate or methacrylate monomer and a prepolymer and when UV curing is to be used a photoinitiator or photosensitiser is required.

Attempts have been made to increase curing efficiency and reduce the need to use photoinitiators by increasing the sensitivity of compositions however in many cases this reduces their stability and also reduces the options available to the end user.

The present invention provides a radiation polymerisable composition comprising:

(A) a donor/acceptor component for forming a charge transfer complex said component being selected from the group consisting of:
  (i) a bifunctional compound having an electron donor group and an electron withdrawing group and a polymerisable unsaturated group;
  (ii) a mixture of (a) at least one unsaturated compound having an electron donor group and a polymerisable unsaturated moiety; and (b) at least one unsaturated compound having an electron acceptor group and a polymerisable unsaturated group; and
(B) a binder polymer composition.

The binder polymer in contrast to the donor acceptor composition will not interact with the components of the donor/acceptor complex to form a change transfer complex.

In contrast with the donor/acceptor component which has a relatively low molecular weight, typically if no more than about 1100 and has a high proportion of unsaturation to readily form donor accepter charge transfer complexes the binder polymer has a significantly higher molecular weight and low level of residual unsaturation. The molecular weight of the binder polymer is higher than 1100, preferably greater than 2000 or a highly viscous material and most preferably greater than 5000. The binder polymer is typically a solid or a highly viscous material at room temperature though in use in the composition of the invention it will typically be dissolved in the other components. The binder polymer does not readily complex with donors such as triethylene glycol divinyl ether (DVE-3) or acceptor to provide a cured film on its own in the absence of a donor/acceptor complex.

Suitable donor/acceptor complexes for use in the present invention are disclosed in U.S. Pat. No. 5,446,073 by Jonsson et al. We have found that such complexes in the absence of a binder polymer can not be adequately controlled for commercial use. Further their use generally requires newly developed excimer lasers which are not commonly used in current industrial UV curing system.

The compositions of the invention by contrast allow rapid cure and yet allow their use to be controlled to provide useful industrial application in many cases allowing UV curing in the absence of photoinitiators and yet are relatively inexpensive.

The compounds employed to provide the charge transfer complex can be ethylenically unsaturated or acetylenically unsaturated. When the complex is from two or more compounds, typically, the double bond molecular ratio of the electron donating compound to the electron withdrawing compound is about 0.5 to about 2, and more typically about 0.8 to about 1.2 and preferably about 1:1. In contrast the binder polymer has a ratio typically less than 0.5 and preferably no more than 0.3. It will be understood that the double bond ratio of the binder may be different in different donor/acceptor complexes and remain inert with respect to donor/acceptor interaction under the conditions used. The complexes employed for the present invention are stable under normal conditions.

In particular, the compositions do not spontaneously polymerise. The strength of both the donor and acceptor groups are not to the high level that could result in spontaneous polymerisation. Instead they polymerise under the influence of the necessary ultraviolet light or ionising radiation.

The charge transfer complex formed from the donor/acceptor is capable of absorbing light having a wave-length that is longer than the longest wavelength in the spectrum of light absorbed by the individual donor and withdrawing groups used to form said complex. The ultraviolet light is thus absorbed by the charge transfer complex rather than by individual groups or components forming said complex. This difference in absorptivity is sufficient to permit the polymerisation of said complex to proceed by absorbing light.

In the terms of commercial utilisation, the complex typically absorbs light which has a wavelength that is about 10 nanometers longer than the shortest wavelength in the spectrum of light absorbed by the individual donor and withdrawing groups or components. This facilitates tailoring the spectral output from the ultraviolet light source to assure the desired polymerisation.

The complex should, on initial exposure to UV, lead to radicals which can initiate free radical polymerisation. In addition to UV, the polymerisation can also be achieved by the use of ionising radiation such as gamma rays or electrons from an electron beam machine. This process can be achieved to workable radiation doses and in air.

The electron withdrawing and electron donating compounds can be represented by the following formula:

$$(A)_n\text{—R and }(D)_n\text{—R, respectively;}$$

wherein "n" is an integer preferably from 1 to 4, "R" is the structural part of the backbone. "A" is the structural fragment imparting acceptor properties to the double bond.

This is selected from the groups outlined in the Jonsson et al Patent (U.S. Pat. No. 5,446,073) and consists of maleic diesters, maleic amide half esters, maleic diamides, maleimides, maleic acid half esters, maleic acid half amides, fumaric acid diesters and monoesters, fumaric diamides, fumaric acid monoesters, fumaric acid monoamides, exomethylene derivatives, itaconic acid derivatives, nitrile derivatives of preceding base resins and the corresponding nitrile and imide derivatives of the previous base resins particularly maleic acid and fumaric acid.

Typical electron withdrawing compounds are maleic anhydride, maleamide, N-methyl maleimide, N-ethyl maleimide, N-phenyl maleamide, dimethyl maleate, diethyl and dimethyl fumarate, adamantane fumarate and fumaric dinitrile. Analogous maleimide, N-methyl maleimide, N-ethyl maleimide, phenyl maleimide and their derivatives can also be used.

Examples include polyethylenically unsaturated polyesters, for example, polyesters from fumaric acid and maleic acid or anhydrides thereof.

"D" is the structural fragment imparting donor properties to the double bond and is selected from the groups outlined below. Examples of component D are provided in the Jonnson et al U.S. Pat. No. 5,446,073 and includes vinyl ethers, alkenyl ethers, substituted cyclopentanes, substituted cyclohexanes, substituted furanes or thiophens, substituted pyrans and thiopyrans, ring substituted styrenes, substituted alkenyl benzenes, substituted alkenyl cyclopentanes and cyclohexenes. In the styrene systems, substituents in the ortho- and para-positions are preferred. Unsaturated vinyl esters like vinyl acetate and its derivatives can also be used.

In addition, polyfunctional, that is, polyunsaturated compounds including those with two, three, four or even more unsaturated groups can likewise be employed.

With respect to the ethers, mono-vinyl ethers and di-vinyl ethers are especially preferred. Examples of mono-vinyl ethers include alkylvinyl ethers typically having a chain length of 1 to 22 carbon atoms. Di-vinyl ethers include di-vinyl ethers of polyols having for example 2 to 6 hydroxyl groups including ethylene glycol, propylene glycol, butylene glycol, 3 methyl propane triol and pentaerythritol.

Examples of some specific electron donating materials are monobutyl 4 vinylbutoxy carbonate, monophenyl 4 vinylbutoxy carbonate, ethyl vinyl diethylene glycol, p-methoxy styrene, 3,4 dimethoxy propenyl benzene, N-propenyl carbazole, monobutyl 4 propenyl butoxy carbonate, monophenyl 4-propenyl butoxy carbonate, isoeugenol and 4-propenylanisole. Vinyl acetate is also active especially with monomers like maleic anhydride and the maleates.

Typical bifunctional compounds containing both acceptor or withdrawing groups and a donor group can be used and are listed in the Jonnson et al patent. Examples of suitable bifunctional compounds include those made from condensing maleic anhydride with 4-hydroxybutyl vinyl ether and the like.

A further limitation of the donor/acceptor composition disclosed in Jonnson is the relative expense of many donor/acceptor components relative to the UV curable monomers currently used in industry. Among the less expensive acceptor components is maleic anhydride (MA) which can be combined with a donor, which may be a vinyl ether such as triethylene glycol di-vinyl ether, to provide a cured film.

In practical commercial situations, the above system suffers from several disadvantages, especially when used with current industrial lamp systems on line. This problem is apparent for example in clear coating applications. It would be an advantage for companies to be able to use the current commercial lamp systems with donor/acceptor charge transfer complexes described above, otherwise the addition and installation of more efficient lamps becomes very expensive and limits the application of the process. Newly developed excimer sources such as the Fusion V.I.P. system will cure most of the systems discussed above if they can be converted into stable films prior to curing. These V.I.P. systems are expensive and their ready availability is required, however there are currently few V.I.P. commercial facilities on stream. The present CT system in the Jonnson et al patent possesses a number of limitations in practical use even with the V.I.P. lamp system. Thus MA, although the cheapest of available donors, suffers from the disadvantage of solubility when used with the less expensive donors like DVE-3. This problem causes the MA to crystallise out of solution when the DA mixture is at temperatures of 25° C. or lower, i.e. common room temperature. Thus storage and transit become a problem under these conditions and the mixture to be used must be reheated carefully before application to redissolve the MA. This heating operation can give rise to significant dangers since the CT complex is very temperature sensitive and can exothermically explode if the heating is not performed carefully. This heating operation would be difficult in commercial environments. In addition, at the time of application, the mixture needs to be at temperatures above 25° C. otherwise coating is a problem and so the line and the mixture need to be continuously heated for application. MA has another disadvantage in this work due to its volatility and odour, which is unacceptable for certain applications at the level of MA used. The problem is not confined to the DVE-3 complex. The other ethers behave in a similar manner and are more expensive than DVE-3.

Of the available acceptors other than maleates, the maleimides are the most reactive such as the alkyl derivatives such as N-hexyl maleimide. The problem with the maleimides is their toxicity and thus extreme caution must be exercised in commercial situations with such materials. Their use is not therefore favoured industrially.

A problem also exists with the most economically available donors such as DVE-3. These materials have very low viscosity which can render the final coating formulations unsatisfactory for many commercial applications since the coatings can either run off or be absorbed by the substrate. We have found that the viscosities of such formulations need to be increased significantly before the coatings are suitable for industrial use.

The binder polymer such as polyester alkyd and vinyl ether polymers have been found to improve the cure speed particularly of MA/DVE-3 and similar complexes and to improve the stability of the complexes prior to cure. A further advantage of such binder polymers is that they reduce significantly the odour of MA/DVE-3 complex and related complexes.

The weight ratio of donor/acceptor complex to said binder polymer is typically in the range of 1:99 to 95:5 with from 30:70 to 70:30 being preferred and 60:40 to 40:60 being most preferred.

In a further preferred embodiment the acceptor comprises a mixture of maleic anhydride and an ester selected from the group consisting of the mono- and di-methyl and ethyl maleic esters. While the weight ratio of ester to MA can be up to 99:1 we have found that the best rate of cure is provided if the ratio of ester to MA is less than 75:25 and more preferably 75:25 to 25:75. Most preferably a diester is used and the ratio of diester to MA is in the range of 60:40 to 40:60.

Surprisingly we have found that the use of the binder polymer gives stability to compositions such as maleic anhydride and increases viscosity of composition. A particular advantage is the improved solubility of the accepter component particularly maleic anhydride and the donor particular ethers including vinyl ethers such as triethylene glycoldivinylether (DVE-3). The presence of the binder also leads to improved complex stability at a range of temperatures especially room temperature at which most applications occur.

The preferred binder polymers are selected from unsaturated polyesters, vinyl ethers, polystyrene polyarylamides, polyvinyl acetate, polyvinyl pyrrolidones, acrylonitrile butadiene styrene, cellulose derivatives and mixtures thereof.

Polyesters and polyvinyl ethers are preferred and most preferred are alkyd polyesters prepared from copolymers of a polyol such as alkylene glycol or polyalkylene glycol and anhydride such as maleic anhydride phthalic anhydride or mixture thereof. One specific example of the preferred polyester alkyd is available from Orica Ltd Australia and is prepared from propylene glycol, phthalic anhydride and maleic anhydride. An example of the less preferred vinyl ether polymer binder is Vectomer 1312 brand vinyl ether polymer of Allied Signal, USA.

If photoinitiators are used for example in highly pigmented systems, suitable examples of photoinitiators may include benzoin ethers such as α,α-dimethoxy-2-phenylacetophenone (DMPA); α,α-diethoxy acetophenone; α-hydroxy-α α-dialkyl acetophenones such as α-hydroxy-α, α-dimethyl acetophenone and 1-benzoylcyclohexanol; acyl phosphine oxides such as 2,4,6-trimethylbenzolyl diphenyl phosphine oxide and bis-(2,6-dimethoxybenzoyl)-2,4.4-trimethylphenylphosphine; cyclic photoinitiators such as cyclic benzoic methyl esters and benzil ketals; cyclic benzils; intermolecular hydrogen abstraction photoinitiators such as benzophenone, Michlers ketone, thioxanthones, benzil and quinones; and 3 ketocoumarins. Typical of such photoinitiators are the Ciba Geigy range of Irgacure 819, 1800, 1700 and the like, also Darocure 1173.

In the case of clear coatings a photoinitiator may not be necessary or may be used in minor amounts of up to 2% if desired. Pigmented systems may use a photoinitiator with the amount required depending on the level of pigmentation. Amounts of PI may be up to 6% by weight are typical.

The photoinitiator component may also be used in combination with an amine coinitiator particularly a tertiary amine coinitiator. This is particularly preferred in the case of the intermolecular hydrogen abstraction photoinitiators such as benzophenone. The amine is generally triethanolamine or an unsaturated tertiary amine such as dimethylaminoacrylate, diethylaminoethylacrylate or the corresponding methacrylates. An amine/acrylate adduct such as that sold under the trade name Uvecryl 115 by Tollchem Pty Ltd Australia is also useful as a coinitiator. Where the unsaturated amine is used it will of course contribute to the monomer or polymer component. If the latter components are used as PI, care must be exercised in formulation to show that the components of the original CT complex do not interfere and slow the cure.

Oligomer acrylates such as epoxy acrylate, urethane acrylate and polyester acrylate may be used if desired. In addition acrylate monomers may also be used as additives especially the multifunctional acrylates like tripropylene glycol diacrylate (TPGDA) which improve cross linking and are also used to speed up cure of oligomer acrylates and UV cure.

Such materials are supplied by Sartomer, UCB and the like. Again, if the acrylate monomers are incorporated Pt is needed to achieve cure. The level of PI is significantly high being of the order of at least 1% by weight of total polymer.

Finally mixtures of acrylate oligomer with acrylate monomer (e.g. TPGDA) may also be used in combination instead of either, separately. Again in this instance PI will be needed at the levels previously mentioned for oligomer acrylate and acrylate monomer when used individually.

Examples of ethylenically unsaturated monomers that can be used include unsaturated carboxylic acids and esters particularly acrylate and methacrylate esters.

Acrylamides, allyl compounds such as diallyl phthalate, maleimide and its derivatives; maleic acid, maleic anhydride, fumaric acid, and their esters and amides, and other unsaturated compounds such as benzene, di-vinyl benzene, N-vinylcarbazole and N-vinylpyrrolidone.

The preferred monomers are monomers comprising a plurality of acrylate or methacrylate functional groups which may be formed, for example, from polyols or the like. Examples of such multifunctional acrylates include trimethylolpropane triacrylate (TMPTA) and its ethoxylated derivative, neopentyl glyol diacrylate, tripropyleneglycol diacrylate (TPGDA), hexanediol diacrylate (HDDA) and polyethyleneglycol diacrylates such as that formed from PEG 200. The molecular weight of the monomer will typically be less than 2000.

The composition used in the method of the invention may include a thermal polymerisation inhibitor such as di-t-butyl-p-cresol, hydroquinone, benzoquinone or their derivatives and the like. Di-t-butyl-p-cresol is preferred. The amount of thermal polymerisation inhibitor is typically up to 10 parts by weight relative to 100 parts by weight of the resin component.

The composition may contain an ultraviolet light stabiliser which may be a UV absorber or a hindered amine light stabiliser (HALS). Examples of UV absorbers include the benzotriaziols and hydroxybenzophenones. The most preferred UV stabilisers are the HALS such as bis(1,2,2,6,6-pentamethyl-4-piperidyl) sebacate which is available from Ciba as TINUVIN 292 and a poly[6-1,-1,3,3-tetramethylbutyl)imino-1,3,5-triazin-2,4-diyl] [2,2,6,6-tetramethyl-4-piperidyl)imino] hexamethylene [2,2,6,6-tetramethyl-4-piperidyl)imino] available from Ciba under the brand name TINUVIN 770. The amount of UV stabiliser that is effective will depend on the specific compounds chosen but typically up to 20 parts by weight relative to 100 parts by weight of resin component will be sufficient.

The UV stabiliser may be used simply to provide UV protection to the coating applied in accordance with the invention in which case up to 10 parts by weight will generally be adequate and in the case of HALS 0.05 to 5 parts is preferred. In some embodiments however it may be desirable to use a high concentration of stabiliser particularly where UV protection is also to be provided for the substrate to which the coating is to be applied.

If flame retardency is desired the composition used in the process of the invention may include one or more flame retarding additives. Preferred examples of such additives may be selected from the following:

a: "FYROL 76"*(with and without free radical catalyst such as tertiary butyl hydroperoxide, cumene peroxide or ammonium persulphate);

b: "FYROL 51"* c: "FYROL 6"*and/or "FYROL 66"*with and without catalyst; PRODUCTS OF AKZO CHEMICALS LTD.;

d: "PE-100" and "W-2" (EASTERN COLOR CHEMICALS P/L) of the USA;

e: "PROBAN" *with and without catalyst such as ammonia or an amine; *an ALBRIGHT AND WILSON Aust. PTY LTD. PRODUCT;

f. "PYROVATEX" *with and without catalyst; *a CIBA GEIGY Aust. PTY LTD. PRODUCT;

g: "PYROSET" *"TPO" and "TKOW" with and without catalyst; *PRODUCTS OF CYANAMID Aust. PTY. LTD.;

h: simple phosphates such as mono, di, and triammonium ortho phosphates and their alkali metal equivalents;

i: alkali metal and ammonium sulphamates;

j: alkali metal and ammonium range of poly phosphates;

k: ammonium sulphates;

l: alkali metal and ammonium chromates and dichromates;

m: alkali metal carbonates;

n: alkali metal tungstate;

o: boric acid and borax;

p: organo phosphorus or organo boron compounds;

and mixtures of two or more of the above.

The preferred amount for each system may be determined by experiment. When the additives are used with the resin, the finished product may be fire retarded in accordance with Australian Standard AS1530 Parts 2 and 3.

Particularly preferred fire retarding additives are Fyrol 76, Fyrol 51, PE-100 and W-2 and mixtures thereof. The other flame retardants in "a" to "p" are best used for specific applications and as with all the above retarding additions, their conditions of use are determined by the equivalent level of phosphorus present in the finish. When the Fyrols or PE-100 or W-2 are used, the amounts are 1 to 50% based on the mass of resin solids with 2 to 20% preferred. Generally, the equivalent proportion of elemental phosphorus (and boron if used in combination) in the combination to a level of 4.0% P is needed to achieve the required flame retardancy. However, significantly less may be needed depending on the substrate material. For example some materials may need only 2.0% P. In such cases the exact levels of phosphorus containing compound required are determined exactly by experiment. Thus the range covered from 0.02 to 15% of elemental phosphorus based on the mass of the substrate material to be treated may be used, with 0.2 to 4.0% P being the preferred range to achieve flame retardancy. Flame retardants are particularly useful where the coating is to be applied to a textile or natural or synthetic fibre.

We have also found that superior coating properties are provided when the coating is applied to a wet substrate.

Additional additives which may be used in the formulations are wetting agents, water if required, matting agents, solvents if required, fluorinated additives and silanes to improve gloss and flow, surfactants, levelling agents, fillers, pigments, slip agents and defoaming agent.

A further aspect of the current invention is the ability to reduce the gloss of the clear coating to give either a matt or semi gloss UV cured finish. This is accomplished by adding to a 1:1:2 mol. ratio mixture of MA, DVE-3, PE 4% calcium carbonate and 4% of pyrogenic silica (Acermaft OK 412, De Gussa) with 4% Irgacure 819 to give a semi gloss UV finish. If the calcium carbonate is increased to 6% and the Irgacure 819 to 8% a matt UV cured finish is achieved.

The invention further provides a process for preparing a radiation curable composition comprising forming a mixture of:

(a) at least one unsaturated compound having an electron donor group and a polymerisable unsaturated moiety; and (b) at least one unsaturated compound having an electron acceptor group;

in the presence of a binder polymer to form a donor/acceptor charge complex from said components (a) and (b).

The process may further include addition of one or more further components such as the photoinitiator, monomer, pigment and flame retarders in accordance with respective components described above.

The invention will now be described with reference to the following examples. It is to be understood that the examples are provided by way of illustration of the invention and that they are in no way limiting to the scope of the invention.

EXAMPLES

In order to describe experimentally the observations of the invention, the data are listed in three categories shown in Tables 1–3. Three lamp types were used in this work (i) a Fusion UV facility with "D" bulb of 300 Watts/inch operating at a line speed of 16 m./min. This lamp delivered a peak intensity of 1.7 W/cm2 corresponding to a dose of 460 mJ/cm2; (ii) Fusion V.I.P. excimer source operating at 16 m./min and delivering a peak intensity of 5.0 W/cm2 and (iii) a conventional 300 W/inch mercury lamp at 20 m./min with dose conditions lightly lower than lamp (i). The runs with lamp (i) thus acted as an optimum guide for performance with lamp (iii) and therefore the results for lamps (i) and (ii) are only recorded in Table 1–3. Examples 1 to 23 in Table 1 are for examples of simple 1:1 complexes of the various donor and acceptor monomers used. The MA samples are particularly difficult to work with since the MA tends to be unstable in the ether below 25° C. A small number of vinyl ethers, DVE-3, CHVE and TEGDVE cure without photoinitiator (PI) like irgacure 819. Others will cure with inclusion of small percentages of PI as shown in Table 1. HBVE when used with MA will cure without PI under the excimer source but not with UV. Other DA combinations will cure with conventional mercury arc V source (300 W/inch at 20 m./min) in the presence of PI.

Examples 24 to 29 shown in Table 2 are a variation from Table 1 showing combinations of some of the monomers effective in curing. Thus CHVE can be combined with DVE-3 or HBVE in certain ratios to give complexes which cure with both UV and excimer sources without PI. Other combinations typified by the remaining examples in Table 2, require small amounts of PI to cure with UV. In this respect the excimer gives better reactivity.

Examples 30 to 45 in Table 3 demonstrate compositions of the invention containing a binder polymer of the polyester alkyd type previously described and supplied by Orica which is incorporated into the CT complex mixture, there is a large overall improvement in the properties of the CT resin before commercial use. Typical results are shown in Table 3 for representative complexes used. The incorporation of Allied Signal's vinyl ether oligomer, Vectomer VE 1312, instead of polyester, acts in a similar manner as the data in Table 3 shown. The Vectomer VE 1312 is a polyfunctional vinyl ether terminated polyester. Allied Signal of Morristown, N.J., U.S.A., has a number of these oligomers but the VE 1312 is the most satisfactory.

In the Tables 1–3, photoinitiators (PI) are used in certain samples.

TABLE NO. 1

Preferred UV Cured CT Complexes as Base Monomer Resins
(See key at page bottom)

| Example | System Mixtures | | Mol. Ratios | UV No. P.I. | UV P.I. % w/w 819 | EXCIMER No P.I | EXCIMER P.I. % w/w 819 |
|---|---|---|---|---|---|---|---|
| 1 | MA | DVE-3 | 1:1 | C | C | C | C |
| 2 | MA | CHVE | 1:1 | C | C | C | C |
| 3 | MA | TEGDVE | 1:1 | C | C | C | C |
| 4 | MA | HBVE | 1:1 | N.C. | C(1.0) | C | C |

TABLE NO. 1-continued

Preferred UV Cured CT Complexes as Base Monomer Resins
(See key at page bottom)

| Example | System Mixtures | | Mol. Ratios | UV No. P.I. | UV P.I. % w/w 819 | EXCIMER No P.I | EXCIMER P.I. % w/w 819 |
|---|---|---|---|---|---|---|---|
| 5  | MA    | PMeOST | 1:1 | N.C. | C(2.0) | N.C. | C(1.0) |
| 6  | MA    | PBr-ST | 1:1 | N.C. | C(2.0) | N.C. | C(1.0) |
| 7  | MA    | NVF    | 1:1 | N.C. | C(0.2) | N.C. | C(0.2) |
| 8  | MA    | NVP    | 1:1 | N.C. | C(2.0) | N.C. | C(2.0) |
| 9  | DMMA  | DVE-3  | 1:1 | N.C. | C(0.5) | N.C. | C(0.1) |
| 10 | DMMA  | NVP    | 1:1 | N.C. | C(0.3) | N.C. | C(0.5) |
| 11 | DMMA  | NVF    | 1:1 | N.C. | C(0.2) | N.C. | C(0.3) |
| 12 | DMMA  | TEGDVE | 1:1 | N.C. | C(0.2) | N.C. | C(0.2) |
| 13 | DEMA  | DCE-3  | 1:1 | N.C. | C(0.5) | N.C. | C(0.3) |
| 14 | DEMA  | NVP    | 1:1 | N.C. | C(0.4) | N.C. | C(0.4) |
| 15 | DEMA  | NVF    | 1:1 | N.C. | C(0.4) | N.C. | C(0.4) |
| 16 | DBMA  | DVE-3  | 1:1 | N.C. | C(1.0) | N.C. | C(1.0) |
| 17 | DiBMA | DVE-3  | 1:1 | N.C. | C(1.0) | N.C. | C(1.0) |
| 18 | DBMA  | NVF    | 1:1 | N.C. | C(1.0) | N.C. | C(1.0) |
| 19 | DiBMA | NVF    | 1:1 | N.C. | C(1.0) | N.C. | C(1.0) |
| 20 | DAMA  | DVE-3  | 1:1 | N.C. | C(1.0) | N.C. | C(0.8) |
| 21 | DAMA  | NVF    | 1:1 | N.C. | C(0.2) | N.C. | C(0.5) |
| 22 | DAMA  | NVP    | 1:1 | N.C. | C(0.2) | N.C. | C(0.5) |
| 23 | DMF   | DVE-3  | 1:1 | N.C. | C(0.5) | N.C. | C(0.3) |

Key to Tables
MA = Maleic anhydride
DMMA = Di methyl maleate
DEMA = Di ethyl maleate
DBMA = Di butyl maleate
PMeOST = p-methoxy styrene
NVF = N-Vinyl formamide
TEGDVE = Tetra ethylene glycol divinyl ether
CHVE = 1,4-cyclohexane dimethanol divinyl ether
N.C. = Not cured
DVE3 = 3 Ethylene glycol divinyl ether
DiBMA = Di isobutylmaleate
DMF = Di Methyl fumarate
DAMA = Di allyl maleate
PBrSt = p-Bromostyrene
NVP = N-Vinyl pyrrolidone
HBVE = 4-hydroxy butyl vinyl ether
C = cured

TABLE NO. 2

Preferred Monomer Mixtures in CT Cure as
Base Resins (No Polyester)
(See Key Table 1)

| Example | System Mixtures | Proportions Mol. Ratios | UV No. P.I. | UV P.I. % w/w | EXCIMER No P.I. | EXCIMER P.I % w/w |
|---|---|---|---|---|---|---|
| 24 | MA:CHVE:DVE-3  | 2.0:1:1.0     | C    | C      | C    | C      |
| 25 | MA:CHVE:HBVE   | 1.5:1.0:0.5   | C    | C      | C    | C      |
| 26 | MA:DVE-3:HBVE  | 2.0:1.0:1.0   | N.C. | C(0.1) | C    | C      |
| 27 | MA:CHVE:HBVE   | 2.0:1.0:1.0   | C    | C      | C    | C      |
| 28 | MA:DMMA:DVE3   | 0.5:0.5:1.0   | N.C. | C(0.1) | C    | C      |
| 29 | MA:DAMA:DVE3   | 0.5:0.5:1.0   | N.C. | C(1.0) | N.C. | C(0.5) |

Key to Table 2 same as Table 1

TABLE NO. 3

Preferred Monomer Mixtures in CT Cure
with Polyester & VE 1312

| Example | System Mixtures | Proportions Mol. Ratios | Mol. Ratio DA/PE | UV No P.I. | UV P.I. % w/w | EXCIMER No P.I. | EXCIMER P.I. % w/w |
|---|---|---|---|---|---|---|---|
| 30 | MA:DVE3:PE       | 1:1:2         | 1:1 | C    | C       | C    | C      |
| 31 | MA:DMMA:DVE3:PE  | 0.5:0.5:2:4   | 3:4 | N.C. | C(0.1)  | C    | C      |
|    |                  | 0.5:1.5:2:4   | 1:1 | N.C. | C(0.5)  | C    | C      |
|    |                  | 0.2:1.8:2:4   | 1:1 | N.C. | C(0.75) | N.C. | C(0.1) |

TABLE NO. 3-continued

Preferred Monomer Mixtures in CT Cure with Polyester & VE 1312

| Example | System Mixtures | Proportions Mol. Ratios | Mol. Ratio DA/PE | UV No P.I. | UV P.I. % w/w | EXCIMER No P.I. | EXCIMER P.I. % w/w |
|---|---|---|---|---|---|---|---|
| 32 | MA:DEMA:DVE-3:PE | 1:1:2:4 | 1:1 | N.C. | C(0.1) | C | C |
| 33 | MA:CHVE:DVE-3:PE | 1:0.5:0.5:2 | 1:1 | C | C | C | C |
| 34 | MA:DBMA:DVE-3:PE | 0.5:1.5:2:4 | 1:1 | N.C. | C(1.0) | N.C. | C(0.7) |
|  |  | 0.2:1.8:2:4 | 1:1 | N.C. | C(1.25) | N.C. | C(1.0) |
| 35 | MA:DAMA:DVE-3:PE | 1:1:1:1 | 3:1 | N.C. | C(1.0) | N.C. | C(0.5) |
| 36 | DMMA:NVF:PE | 1:1:1 | 2:1 | N.C. | C(0.2) | N.C. | C(0.1) |
| 37 | DMMA:NVF:PE | 1:1:1 | 1:1 | N.C. | C(0.5) | N.C. | C(0.1) |
| 38 | DMMA:DEMA:DVE-3:PE | 0.5:0.5:1:2 | 1:1 | N.C. | C(0.5) | C | C |
| 39 | DMMA:DVE-3:PE | 1:1:1 | 1:1 | N.C. | C(0.5) | C | C |
| 40 | DMMA:NVF:PE | 1:1:1 | 1:1 | N.C. | C(0.5) | N.C. | C(0.1) |
| 41 | DEMA:DVE-3:PE | 1:1:1 | 1:1 | N.C. | C(0.5) | N.C. | C(0.3) |
| 42 | DMF:DVE-3:PE | 1:1:1 | 1:1 | N.C. | C(0.5) | N.C. | C(0.7) |
| 43 | MA:NVF:PE | 1:1:2 | 1:1 | N.C. | C(0.1) | N.C. | C(0.1) |
| 44 | MA:DVE-3:PE + 50% VE1312* | 1:1:2 + 50% | 1:1 | C | C | C | C |
| 45 | MA:NVF:PE + 20% VE1312* | 1:1:2 + 20% | 1:1 | N.C. | C(0.1) | N.C. | C(0.1) |

*BY weight of complex + P.E.
Key to Table 3 same as for Table 1 and:
PE + Polyester as defined in text
VE1312 = Allied Signal Oligomer as in Text To prepare the composition of Table 3 the donor (eg DVE-3) is mixed with the binder polymer (eg PE) to form a solution of the binder polymer in the donor. The acceptor (eg MA) is then added. In some cases the mixture was warmed to fully dissolve the acceptor. The resulting charge transfer complex may also be used with other additives.

Pigmentation of the Above Resins

For the production of inks and coatings the above resin systems will contain pigments or filler or both. For inks the level of pigments/filler will not necessarily be the same as for paints. Inks are essentially pastes to be applied by presses and the like whereas paints are of lower viscosity and are applied by spray, roller coat, curtain coat, volume coat and the like.

Inks

Comparative Example 46

The level of PI needed in conventional UV inks using acrylate and related technology is shown in Table 4. These are typical of the amounts needed using current UV lamps.

TABLE 4

Levels of PI Needed to Cure Conventional UV Inks*

| Colour | Pigment Loading to Cover (%) | PI (% W/W Total Ink) |
|---|---|---|
| Black | 20 | 10 |
| Blue | 15 | 10 |
| Red | 18 | 10 |
| Yellow | 12 | 10 |
| White | 50 | 4 |

*On a 200 Watt/inch mercury arc lamp line running at 20 meters/min

The PI's are generally mixtures to optimise performance. For example, in black there may be 3% Irgacure 369 and 7% Irgacure 651. The values in Table 4 are approximate and will depend on mixtures of PI's. Within the ink systems themselves there is variation in the level of pigmentation used and therefore concentration of PI will be pro rata, depending on the pigment and the type of system. Thus lithographic inks use 10–30% of pigment (about 20% most common), flexographic 8–20% (12–14% most common), gravure 8–10% (8–10% most common), screen 5–15% most common and letterpress 18–20% most common.

Examples 47–82

When used with the resin systems of the invention, typical photoinitiator levels, may be needed to cure, are described in Table 5. Under some circumstances, white pigment with 600 Watts/inch excimer source, no PI is needed in the ink to achieve cure at line speeds of up to 10 meters/min. and higher.

Thus the advantages of using the new resin system are that under certain pigmentation conditions, no PI is needed to cure and where PI is needed the amount of PI is significantly lower than in conventional UV systems currently used.

TABLE 5

PIGMENTED POLYMERS
Photoinitiator Levels for Inks
for the Current Polymer Systems

| Example | | Preferred Range PI % |
|---|---|---|
| | White (50%) | |
| 47 | White: (MA:DVE-3)(1:1) by weight* | 0.0–1.5 |
| 48 | White: (MA:DVE-3)(1:1) + 50% 1312 w/w | 0.0–1.0 |
| 49 | White: (MA:DVE-3)(1:1) + 25% 1312 | 0.0–1.3 |
| 50 | White: (MA:DVE-3):PE(2:1:1) | 0.0–0.3 |
| 51 | While (MA:DVE-3):PE(2:1:1) + 25% 1312 | 0.0–0.3 |

*50% White pigment with 50% resin consisting of MA:DVE-3 in ratio of 1:1 by weight.
Remaining pigment samples in same concept.

| | Blue (15%) | |
| 52 | Blue:(MA:DVE-3)(1:1) | 0.0–1.5 |
| 53 | Blue: (MA:DVE-3)(1:1) + 50% 1312 | 0.0–1.3 |
| 54 | Blue: (MA:DVE-3)(1:1) + 25% 1312 | 0.0–1.3 |
| 55 | Blue: (MA:DVE-3):PE(2:1:1) | 0.0–3.0 |
| 56 | Blue: (MA:DVE-3):PE(2:1:1) + 25% 1312 | 0.0–3.0 |

TABLE 5-continued

PIGMENTED POLYMERS
Photoinitiator Levels for Inks
for the Current Polymer Systems

| Example | | Preferred Range PI % |
|---|---|---|
| | Red (18%) | |
| 57 | Red: (MA:DVE-3)(1:1) | 0.0–3.0 |
| 58 | Red: (MA:DVE-3)(1:1) + 50% 1312 | 0.0–1.5 |
| 59 | Red: (MA:DVE-3)(1:1) + 25% 1312 | 0.0–1.5 |
| 60 | Red: (MA:DVE-3):PE(2:1:1) | 0.0–2.0 |
| 61 | Red: (MA:DVE-3):PE(2:1:1) + 25% 1312 | 0.0–1.5 |
| | Black (20%) | |
| 62 | Black: (MA:DVE-3)(1:1) | 0.0–3.0 |
| 63 | Black: (MA:DVE-3)(1:1) + 50% 1312 | 0.0–6.0 |
| 64 | Black: (MA:DVE-3)(1:1) + 25% 1312 | 0.0–6.0 |
| 65 | Black: (MA:DVE-3):PE(2:1:1) | 0.0–6.0 |
| 66 | Black: (MA:DVE-3):PE (2:1:1) + 25% 1312 | 0.0–6.0 |
| | 20% (18Black:2 Blue) | |
| 67 | Blk/Blu: (MA:DVE-3)(1:1) | 0.0–6.0 |
| 68 | Blk/Blu: (MA:DVE-3)(1:1) + 50% 1312 | 0.0–6.0 |
| 69 | Blk/Blu: (MA:DVE-3)(1:1) + 25% 1312 | 0.0–6.0 |
| 70 | Blk/Blu: (MA:DVE-3):PE(2:1:1) | 0.0–6.0 |
| 71 | Blk/Blu: (MA:DVE-3):PE(2:1:1) + 25% 1312 | 0.0–6.0 |
| | Yellow (12%) | |
| 72 | Yellow: (MA:DVE-3)(3:1) | 0.0–6.0 |
| 73 | Yellow: (MA:DVE-3)(3:1) + 50% 1312 | 0.0–6.0 |
| 74 | Yellow: (MA:DVE-3)(3:1) + 25% 1312 | 0.0–6.0 |
| 75 | Yellow: (MA:DVE-3):PE(2:1:3) | 0.0–6.0 |
| 76 | Yellow: (MA:DVE-3):PE(2:1:3) + 25% 1312 | 0.0–6.0 |
| | HYBRIDS WITH URETHANE ACRYLATE #(20% UR240) | |
| 77 | 18% Red + 82% (MA:DVE-3):PE (1:1:2)* | 0.0–3.6 |
| 78 | 20% Black + 80% (MA:DVE-3)PE (1:1:2) | 0.0–6.0 |
| 79 | 20% Blk/Blu + 80% (MA:DVE-3):PE(1:1:2) | 0.0–6.0 |
| 80 | 12% Yellow + 88% (MA:DVE-3):PE (1:1:2) | 0.0–6.0 |
| 81 | 15% Blue + 85% (MA:DVE-3):PE (1:1:2) | 0.0–4.0 |
| 82 | 50% White + 50% (MA:DVE-3):PE (1:1:2) | 0.0–2.0 |

18% Red pigment by weight with 82% resin consisting of MA:DVE-3:PE in ratios by weight of 1:1:2. Same concept for other pigments
UR240 is a aromatic urethane acrylate from Tollchem and 20% ww of the total composition is added.

Paints

Comparative Example 83

The level of pigmentation for paints varies with the type of paint and its application. UV has not previously been used with one-coat paints since PI's were not available to achieve cure. For paints very lightly pigmented, such as lime wash and the like, pigmentation levels used are of the order of 0.1% and a little higher by weight of paints. In Table 6 are shown typical pigment levels of conventional water based and solvent based gloss enamel paints with their PVC ratio.

TABLE 6

Pigment Levels for Conventional
Interior/Exterior Gloss Enamels
(Water based, Solvent)

| Colour | % Weight | P.V.C |
|---|---|---|
| Red | 11 (9–13) | 15.8 |
| Black | 3.8 | 4.0 |
| Yellow | 9.0 | 12.0 |
| Blue | 9.0 | 8.7 |

When UV is used to cure the paints, the level of PI which may be needed to cure the paint is described in Table 7.

Under some circumstances e.g. white pigment with 600 Watts/inch excimer source, no PI is needed in the paint to achieve cure at line speeds up to 10 meters/min. With lines of lower performance PI's may be needed as described above for the inks.

TABLE 7

PIGMENTED POLYMERS
Photoinitiator Levels for Paint

| Example | | Preferred Range PI % |
|---|---|---|
| | GLOSS PAINT PIGMENT LEVELS | |
| 84 | 11% Red + 89% (MA:DVE-3):PE (1:1:2) | 0.0–2.0 |
| 85 | 3.8% Black + 96.2% (MA:DVE-3):PE (1:1:2) | 0.0–4.5 |
| 86 | 9% Yellow + 91% (MA:DVE-3):PE (1:1:2) | 0.0–4.5 |
| 87 | 10% White + 90% (MA:DVE-3):PE (1:1:2) | 0.0–3.0 |
| 88 | 9% Blue + 91% (MA:DVE-3):PE (1:1:2) | 0.0–1.5 |

11% Red + 89% resin consisting of MA:DVE-3:PE 1:1:2 by weight
Remaining pigments same formula

GLOSS PAINT + 20% UR240*

| 89 | 11% Red + 89% (MA:DVE-3):PE (1:1:2) | 0.0–2.0 |
| 90 | 3.8% Black + 96.2% (MA:DVE-3):PE (1:1:2) | 0.0–4.5 |
| 91 | 3.8% Blk/Blu + 96.2% (MA:DVE-3):PE (1:1:2) | 0.0–4.0 |
| 92 | 9% Yellow + 91% (MA:DVE-3):PE (1:1:2) | 0.0–4.0 |
| 93 | 9% Blue + 91% (MA:DVE-3):PE (1:1:2) | 0.0–3.0 |

Paint formulations are 80% as per formula + 20% UR240 Resin

MATT PAINT
GLOSS PAINT + 20% Filler for matt finish

| 94 | 11% Red + 89% (MA:Dve-3):PE (1:1:2) | 0.0–4.5 |
| 95 | 3.8% Black + 96.2% (MA:DVE-3):PE (1:1:2) | 0.0–4.5 |
| 96 | 3.8% Blk/Blu + 96.2% (MA:DVE-3):PE (1:1:2) | 0.0–4.5 |
| 97 | 9% Yellow + 91% (MA:DVE-3):PE (1:1:2) | 0.0–4.5 |
| 98 | 9% Blue + 91% (MA:DVE-3):PE (1:1:2) | 0.0–4.5 |

Paint formulations are 80% of "Gloss" + 20% Filler for matt finish
DVE-3 = Triethylene glycol divinyl ether
UR240 = aromatic urethane from Ballina P/L
PE = Polyester from Nuplex P/L
MA = Maleic anhydride Specific Pigment Applications A specific application of pigmented finishes is relevant to porous substances particularly timber. Thus timber (and other substrates) can be preprinted with a spirit stain (such as supplied by Wattyl Australia Ltd.) then immediately overcoated with a radiation curable finish, either clear gloss or clear matt. Alternatively, the stain (Hickson, supplier) as a powder can be dissolved in the coating and radiation cured on to timber or substrate.

Typical formulation for treating western red cedar timber:
(i) Stain with Wattyl Spirit Stain
(ii) Then coat with following formula either gloss or matt (coating can be performed any time after stain application.

Example 99

| High Gloss Coating | |
|---|---|
| DVE-3 | 20 g |
| DEMA | 10 g |
| PE | 15 g |
| Irgacure 819 | 0.5 g |

After coating, sample is cured under a 300 Watt/inch mercury arc lamp at 20 meters/min. If Fusion 300 Watt/inch lamp with "D" bulb or an excimer source of 600 Watts/inch is used, no PI is required to cure at 20 meters/min.

Example 100

| Matt Coating | |
|---|---|
| DVE-3 | 23 g |
| DEMA | 10 g |
| PE | 15 g |
| Silica | 2 g |
| Calcium Carbonate | 3 g |
| Irgacure 819 | 0.5 g |

And conditions to cure as for the gloss coating.

Typical examples of clear coatings are listed below. The pigmentation formulation of these coatings is shown in Tables 5 and 7.

Example 101

| Roller Coat Clear Gloss with CT Complex | |
|---|---|
| DEMA | 10 g |
| DVE-3 | 8 g |
| PE | 15 g |

The above formulation Example 101 will cure at room temperature on a typical substrate such as Western Red Cedar timer with Fusion 600 Watts/inch excimer source delivering 5.0 W/cm² at line speed of 16 meters/min. Sources of lower UV performance may need photoinitiator (up to 5% or higher by weight of resin) such as Irgacure 819 or the like to cure at line speeds of up to 20 m/min. and above.

Example 102

| Spray Coat Clear Gloss with CT Complex | |
|---|---|
| DEMA | 10 g |
| DVE-3 | 20 g |
| PE | 15 g |

DEMA is diethyl maleate, DVE-3 is triethylene glycol di-vinyl ether and PE is the polyester previously discussed. Again higher amounts of DVE-3 are needed to achieve spray viscosity. The above formulation will cure at room temperature after being sprayed with a gun operating at 30 p.s.i on a typical substrate such as Western Red Cedar timber using a Fusion 300 Watt/inch excimer source delivering 0.5 J/cm² at a line speed of 16 m/min. with "D" bulbs. Sources of lower UV performance may need photoinitiator (up to 5% or higher, by weight of resin) such as Irgacure 819 or the like to cure a line speeds up to 20 m./min. and above.

Example 103

| Spray Coat Clear Matt with CT Complex | |
|---|---|
| DEMA | 110 g |
| DVE-3 | 23 g |
| PE | 15 g |
| SILICA | 2 g (Matting agent de Gussa No. OK412 |
| CaCO3 | 3 g |

The above formulation will cure at room temperature after being sprayed with a gun operating at 30 p.s.i on a typical substrate such as Western Red Cedar timber using a Fusion 600 Watt/inch excimer source delivering 5 W/cm² at a line speed of 16 m/min. Sources of lower UV performance may need photoinitiator (up to 5% or higher, by weight of resin) such as Irgacure 819) or the like to cure a line speeds up to 20 meters/min. and above. With lines of lower efficiency i.e. lower lamp performance such as 200 Watts/inch mercury lamps and the like PI's may be needed, the preferred levels of use being demonstrated in Table 7.

The higher figure in the Table would be with a 200 Watts/inch mercury arc at 20 meters/min.

Example 104

| Roller Coat Clear Gloss Hybrid Between CT Complex and Acrylates | |
|---|---|
| DEMA | 20 g |
| MA (Maleic anhydride) | 20 g |
| DVE-3 | 30 g |
| PE | 30 g |
| EPOXY ACRYLATE | 20 g |
| TPGDA | 8 g |

The above formulation will cure at room temperature after being sprayed with a gun operating at 30 p.s.i on a typical substrate such as Western Red Cedar timber using a Fusion 600 Watt/inch excimer source as indicated in the first example of the Roller Coat Clear Gloss with CT Complex.

The above formulations are typical resin systems which can be pigmented to give coatings and inks which cure under photoinitiator free UV conditions using sources such as the 600 Watt/inch Fusion lamp. With lamps of lower performance, photoinitiators may be needed such as Irgacure 819 and the like as previously discussed.

Application of Ionising Radiation Sources

The above examples listed for inks and paints have utilised UV and excimer sources with and without PI. If these sources are replaced by ionising radiation sources such as EB (low energy electron beam from ESI or RPC or the equivalent) or Cobalt-60 (or equivalent spent fuel element facility) the coating and inks can be cured without any PI being present. The technique is particularly useful with Co-60 type sources. Here, with the formulations like these for the stain treatment above, curing can be achieved at a dose of up to 0.2 kGy at any dose rate in air. Under nitrogen even lower doses may be used. Higher doses than 0.2 kGy may be used if needed under specific circumstances even up to 5 kGy. For all the formulations in this patent, both clear and pigmented, inks and coatings, can all be cured at doses up to 0.2 kGy at any dose rate without PI and at even lower doses with nitrogen atmosphere. Inclusion of PI leads to lower doses than 0.2 kGy to cure however the film is then contaminated with PI fragments. Under some circumstances and in some applications the presence of these impurities can be tolerated and curing in the presence of the PI can lower the radiation dose to cure to doses up to 0.1 kGy.

Dual Cure System

A further development in the resin technology both in clear and pigmented form is the dual cure system. If a moisture cured urethane (ex Tollchem or Wattyl, Australia) is added to the resin formulations shown in the examples and Tables and the resulting resin UV cured, adhesion is improved and hardness of film and other physical properties are also improved. The improvement is especially evident one hour after curing and for longer times when the moisture cured urethane has fully polymerised. Both aliphatic and aromatic moisture cured resins can be used with and without solvent, preferably without solvent. Two pack urethanes with and without solvent can also be used, the two components preferably being premixed prior to application and curing. The amount of moisture cured resin or two pack urethane used can be any percentage by weight with 5–30% preferred and 5–15% most preferred relevant to the weight of the remaining clear or pigmented resin.

It is to be understood that the invention described herein above is susceptible to variations, modifications and/or additions other than those specifically described and that the invention includes all such variations, modifications and/or additions, which fall within the spirit and scope of the above description.

What is claimed is:

1. A radiation polymerisable composition comprising:
   (A) a donor/acceptor component for forming a charge transfer complex said component being selected from the group consisting of:
      (i) a bifunctional compound having an electron donor group and an electron withdrawing group and a polymerisable unsaturated group; and
      (ii) a mixture of (a) at least one unsaturated compound having an electron donor group and a polymerisable unsaturated moiety; and (b) at least one unsaturated compound having an electron acceptor group and a polymerisable unsaturated group; and
   (B) a binder polymer which will not interact with the donor/acceptor component to form a charge transfer complex;
   wherein the donor/acceptor component comprises maleic anhydride and a donor selected from the group consisting of mono- and di-vinyl ethers and mixtures thereof.

2. A radiation polymerisable composition according to claim 1 wherein the binder polymer has a low level of residual unsaturation such that it does not form a donor/acceptor complex with said donor/acceptor component.

3. A radiation polymerisable composition according to claim 2 wherein the binder polymer is selected from the group consisting of unsaturated polyester, polyvinyl ethers, polystyrene, polyacrylamides, polyvinylacetate, polyvinylpyrrolidones, acrylonitrile butadiene styrene, cellulose derivatives and mixtures thereof.

4. A radiation polymerisable composition according to claim 2 wherein the binder polymeric is selected from the group consisting of polyesters formed from unsaturated acids or anhydrides and polyols: polyvinyl pyrrolidones; and polyvinyl ethers.

5. A radiation polymerisable composition according to claim 1 wherein the binder polymer has a molecular weight greater than 1100.

6. A radiation polymerisable composition according to claim 1 wherein the weight ratio of donor/acceptor component to binder polymer is in the range of 1:99 to 95:5.

7. A radiation polymerisable composition according to claim 1 wherein the amount of donor/acceptor component is at least 20% by weight of the total weight of donor/acceptor component and binder polymer.

8. A radiation polymerisable composition according to claim 7 wherein the binder polymer is a copolymer of a polyol selected from an alkylene glycol polyalkylene glycol and mixtures thereof and an anhydride selected from maleic anhydride, phthalic anhydride and mixtures thereof.

9. A radiation polymerisable composition according to claim 1 wherein the composition further includes one or more radiation polymerisable multifunctional acrylates and acrylated oligomers.

10. A radiation polymerisable composition according to claim 1 containing a photoinitiator, wherein said photoinitiator comprises up to 2% by weight of the total composition.

11. A radiation polymerisable composition according to claim 1 wherein the binder polymer is not an unsaturated polyester.

12. A process for preparing the radiation polymerisable composition according to claim 1 comprising mixing (a) at least one unsaturated compound having an electron donor group and (b) a polymerisable unsaturated compound having an electron acceptor group and a polymerisable unsaturated group and forming the donor/acceptor charge transfer complex from components (a) and (b) in the presence of the binder polymer, wherein the binder polymer is combined with the donor component to form a mixture thereof and the mixture is combined with the acceptor to form a donor/acceptor charge transfer complex.

13. A radiation polymerisable composition comprising:
   (A) a donor/acceptor component for forming a charge transfer complex said component being selected from the group consisting of:
      (i) a bifunctional compound having an electron donor group and an electron withdrawing group and a polymerisable unsaturated group; and
      (ii) a mixture of (a) at least one unsaturated compound having an electron donor group and a polymerisable unsaturated moiety; and (b) at least one unsaturated compound having an electron acceptor group and a polymerisable unsaturated group; and
   (B) a binder polymer which will not interact with the donor/acceptor component to form a charge transfer complex;
   wherein the acceptor selected from the group consisting of di($C_1$–$C_2$) alkyl esters of acrylic acid and a donor selected from the group consisting of mono- and di-vinyl ethers.

14. A radiation polymerisable composition comprising:
   (A) a donor/acceptor component for forming a charge transfer complex said component being selected from the group consisting of;
      (i) a bifunctional compound having an electron donor group and an electron withdrawing group and a polymerisable unsaturated around; and
      (ii) a mixture of (a) at least one unsaturated compound having an electron donor group and a polymerisable unsaturated moiety; and (b) at least one unsaturated compound having an electron acceptor group and a polymerisable unsaturated group; and
   (B) a binder polymer which will not interact with the donor/acceptor component to form a charge transfer complex:
   wherein the acceptor component comprises maleic anhydride and an ester selected from the group consisting of mono- and di-methyl esters of maleic acid and mono- and di-ethyl esters of maleic acid.

15. A radiation polymerisable composition according to claim 14 wherein the weight ratio of maleic anhydride to said esters is in the range of 75:25 to 25:75.

16. The radiation polymerisable composition according to claim 14 wherein the composition further includes one or more radiation polymerisable multifunctional acrylates and acrylated oligomers.

17. A radiation polymerisable composition comprising:
(A) a donor/acceptor component for forming a charge transfer complex said component being selected from the group consisting of;
   (i) a bifunctional compound having an electron donor group and an electron withdrawing group and a polymerisable unsaturated group;
   (ii) a mixture of (a) at least one unsaturated compound having an electron donor group and a polymerisable unsaturated moiety; and (b) at least one unsaturated compound having en electron acceptor group and a polymerisable unsaturated group;
(B) a binder polymer which will not interact with the donor/acceptor component to form a charge transfer complex;
(C) a pigment; and
(D) a photoinitiator, said photoinitiator comprising less than 6% by weight of the total composition.

18. A radiation polymerisable composition according to claim 17 wherein the binder polymer has a molecular weight greater than 1100.

19. A radiation polymerisable composition according to claim 17 wherein the ratio of donor/acceptor component to binder polymer is in the range of 1:99 to 95:5.

20. A radiation polymerisable composition according to claim 17 wherein the amount donor/acceptor component to binder polymer is at least 20% by weight of the total weight of donor/acceptor component and binder polymer.

21. A radiation polymerisable composition according to claim 20 wherein the binder polymer is a copolymer of a polyol selected from an alkylene glycol polyalkylene glycol and mixtures thereof and an anhydride selected from maleic anhydride, phthalic anhydride and mixtures thereof.

22. A radiation polymerisable composition according to claim 17 wherein the polymer is selected from the group consisting of unsaturated polyester, polyvinyl ethers, polystyrene, polyacrylamides, polyvinylacetate, polyvinylpyrrolidones, acrylonitrile butadiene styrene, cellulose derivatives and mixtures thereof.

23. A radiation polymerisable composition according to claim 17 wherein the binder polymer is selected from polyesters formed from the group consisting of unsaturated acids or anhydrides and polyols; polyvinyl pyrrolidones; and polyvinyl ethers.

24. A radiation polymerisable composition according to claim 17 wherein the binder polymer is not an unsaturated polyester.

25. A radiation polymerisable composition according to claim 17 wherein the composition further includes one or more radiation polymerisable multifunctional acrylates and acrylated oligomers.

26. A radiation curable composition according to claim 17 wherein the donor/acceptor component comprises maleic anhydride and a donor selected from the group consisting of mono- and di-vinyl ethers and mixtures thereof.

27. A radiation polymerisable composition according to claim 17 comprising an acceptor selected from the group consisting of di($C_1$–$C_2$) alkyl esters of acrylic acid and a donor selected from the group consisting of mono- and di-vinyl ethers.

28. A radiation polymerisable composition according to claim 17 wherein the acceptor component comprises maleic anhydride and an ester selected from the group consisting of mono- and di-methyl esters of maleic acid and mono- and di-ethyl esters of maleic acid.

29. A radiation polymerisable composition according to claim 28 wherein the weight ratio of maleic anhydride to said esters is in the range of 75:25 to 25:75.

30. A radiation polymerisable composition according to any one of claims 1 to 15 or 11 to 17 additionally comprising one or more materials selected from the group consisting of wetting agents, water, matting agents, solvents, fluorinated additives, silanes, surfactants, leveling agents, fillers, slip agents and defoaming agents.

31. A process for preparing the radiation polymerisable composition according to claim 17 comprising mixing (a) at least one unsaturated compound having an electron donor group and (b) a polymerisable unsaturated compound having an electron acceptor group and a polymerisable unsaturated group and forming the donor/acceptor charge transfer complex from components (a) and (b) in the presence of the binder polymer.

32. A process according to claim 31 wherein the binder polymer is combined with the donor component to form a mixture thereof and the mixture is combined with the acceptor to form a donor/acceptor charge transfer complex.

33. A process for preparing the radiation polymerisable composition according to any one of claims 1 to 15 or 17 to 11 comprising mixing (a) at least one unsaturated compound having and electron donor group and (b) a polymerisable unsaturated compound having an electron acceptor group and a polymerisable unsaturated group and forming the donor/acceptor charge transfer complex from components (a) and (b) in the presence of the binder polymer.

34. A process for preparing the radiation polymerisable composition according to any one of claims 1 to 15 or 11 to 17 comprising mixing (a) at least one unsaturated compound having an electron donor group and (b) a polymerisable unsaturated compound having an electron acceptor group and a polymerisable unsaturated group and forming the donor/acceptor charge transfer complex from components (a) and (b) in the presence of the binder polymer, wherein the binder polymer is combined with the donor component to form a mixture thereof and the mixture is combined with the acceptor to form donor acceptor charge transfer complex.

* * * * *